United States Patent
Takase

(10) Patent No.: US 8,218,981 B2
(45) Date of Patent: Jul. 10, 2012

(54) IMAGE FORMING APPARATUS AND IMAGE FORMING SYSTEM

(75) Inventor: Yuriko Takase, Fukushima (JP)

(73) Assignee: Oki Data Corporation, Tokyo (JP)

( * ) Notice: Subject to any disclaimer, the term of this patent is extended or adjusted under 35 U.S.C. 154(b) by 270 days.

(21) Appl. No.: 12/691,061

(22) Filed: Jan. 21, 2010

(65) Prior Publication Data
US 2010/0189459 A1 Jul. 29, 2010

(30) Foreign Application Priority Data
Jan. 23, 2009 (JP) ................... 2009-013547

(51) Int. Cl.
*G03G 15/00* (2006.01)
(52) U.S. Cl. ................ 399/13; 358/1.15; 399/8
(58) Field of Classification Search .......... 399/8, 9, 399/13, 407; 358/1.15
See application file for complete search history.

(56) References Cited

U.S. PATENT DOCUMENTS

| | | | |
|---|---|---|---|
| 6,608,974 B2 * | 8/2003 | Kurita | 399/13 |
| 7,920,803 B2 * | 4/2011 | Kato | 399/13 X |
| 2003/0063913 A1 * | 4/2003 | Yamazaki | 399/8 |
| 2006/0159467 A1 * | 7/2006 | Takahashi | 399/13 X |
| 2006/0159468 A1 * | 7/2006 | Kouchi et al. | 399/13 |

FOREIGN PATENT DOCUMENTS

JP 2003-233482 8/2003

\* cited by examiner

*Primary Examiner* — Sophia S Chen
(74) *Attorney, Agent, or Firm* — Panitch Schwarze Belisario & Nadel LLP

(57) ABSTRACT

An image forming apparatus is supplied that includes a storage section that previously stores apparatus structure of a self apparatus. A structure detecting section detects apparatus structure of the self apparatus. A setting information generating section generates a definition file and an overwriting program for overwriting the definition file on the basis of the apparatus structure detected by the structure detecting section, and generates apparatus structure change information containing the generated definition file and overwriting program. An information storing section in which a sending address of an image processing apparatus in which a printer driver is installed is stored. A sending section sends the apparatus structure change information to the image processing apparatus on the basis of the sending address. The image processing apparatus automatically updates a printer driver on the basis of the apparatus structure change information.

11 Claims, 19 Drawing Sheets

| | 400 | 401 | 402 | 403 | 404 |
|---|---|---|---|---|---|
| ID | COMPUTER NAME | IP ADDRESS | FILE NAME | FILE PATH | |
| 0 | COMPUTER10 | 192.168.0.3 | opinfo3000.dat | C:¥Windows¥System32¥··· | |
| 1 | COMPUTER5 | 192.168.0.6 | opinfo3000.dat | D:¥Windows¥System32¥··· | |
| 2 | COMPUTER3 | 192.168.0.4 | opinfo3000.dat | C:¥Windows¥System32¥··· | |
| ... | ... | ... | ... | ... | |

[ Option ]

Tray 1
Tray 2

*FIG. 9*

[ Option ]

Tray 1

Tray 2

. . .

Finisher=opfin.dll

*FIG. 17*

IMAGE FORMING APPARATUS AND IMAGE FORMING SYSTEM

FIELD OF THE INVENTION

The invention relates to an image forming apparatus and an image forming system.

BACKGROUND OF THE INVENTION

Various functions can be added to an image forming apparatus by installing different kinds of structure articles, for example, paper feeding unit, duplex unit and finisher.

An image processing apparatus has a printer driver installed that is software for sending image data to the image forming apparatus to perform an image forming.

Then, because a setting of content of the printer driver is changed to correspond to a change of an apparatus structure of the image forming apparatus, that is, newly registration addition and deletion of structure articles, so it is possible to make full use of functions with respect to the image forming apparatus.

Until now, in order to change a setting of structure article content of the printer driver, as mentioned by the patent document, a system is proposed to make user select by displaying different kinds of structure articles, after all, option apparatuses of the image forming apparatus of a connection object on a self display scene in the image processing apparatus, and to reflect the result in a setting of the printer driver.

Patent document 1: Japan patent publication of No. 2003-233482

However, in the system, because it is necessary to perform a selection operation through confirming all kinds of structure articles displayed on a display scene of the image forming apparatus by user in every newly registration installation and deletion of structure article of the image forming apparatus, it is difficult for user to work.

SUMMARY OF THE INVENTION

It is, therefore, an object of the invention to provide an image forming apparatus and an image forming system that can solve the above problem.

A first aspect of the invention is to provide an image forming apparatus capable of changing apparatus structure, comprising: a storing section that previously stores apparatus structure of a self apparatus; a structure detecting section that detects apparatus structure of the self apparatus; and a setting information generating section that generates apparatus structure change information for adapting to a printer driver when the apparatus structure that is detected by the structure detecting section is not consistent with the apparatus structure that has been stored in the storing section.

A second aspect of the invention is to provide an image forming system in which an image processing apparatus in which a printer driver is installed and an image forming apparatus capable of changing apparatus structure are connected capable of communicating, wherein the image forming apparatus comprises; a storing section that previously stores apparatus structure of a self apparatus; a structure detecting section that detects apparatus structure of the image forming apparatus; and a setting information generating section that generates apparatus structure change information for adapting to a printer driver when the apparatus structure that detected by the structure detecting section is not consistent with the apparatus structure that has been stored in the storing section

THE EFFECT OF THE PRESENT INVENTION

According to the present invention, because apparatus structure change information is generated to adapt to a printer driver automatically in the apparatus side when apparatus structure of the image forming apparatus is changed, it is possible to update the printer driver without performing a selection operation of the apparatus structure in the image forming apparatus.

The above and other objects and features of the present invention will become apparent from the following detailed description and the appended claims with reference to the accompanying drawings.

BRIEF DESCRIPTION OF THE DRAWINGS

FIG. 9 is an example of a printer driver definition file after a paper feeding unit 2 is installed;

FIG. 17 is an example of a printer driver definition file after a finisher is installed;

DETAILED DESCRIPTION OF THE PREFERRED EMBODIMENTS

Embodiments of the invention will be described in detail hereinbelow with reference to the drawings.

<Embodiment 1>

(Explanation of Structure of Embodiment 1)

Figure 2:
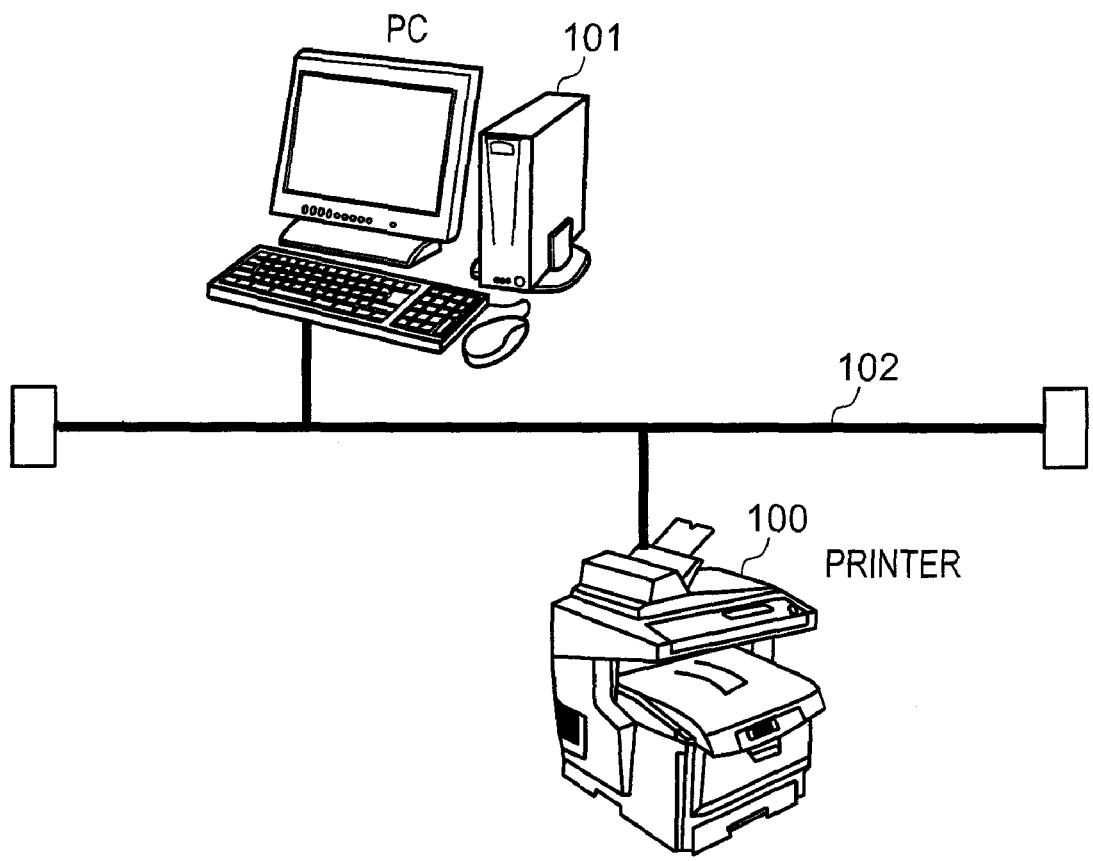
FIG. 2 is a connection diagram (embodiment 1) of an image forming system.

FIG. 2 is a connection diagram of an image forming system. As shown by FIG. 2, an image forming system is comprised by connecting a printer 100 as an image forming apparatus with a personal computer (hereinafter, PC) 101 as an image processing apparatus through a network 102.

The printer 100 and the personal computer 101 have a two-way communication function together.

It is also possible to connect plural numbers of the printers 100 and the personal computers 101.

Figure 3:
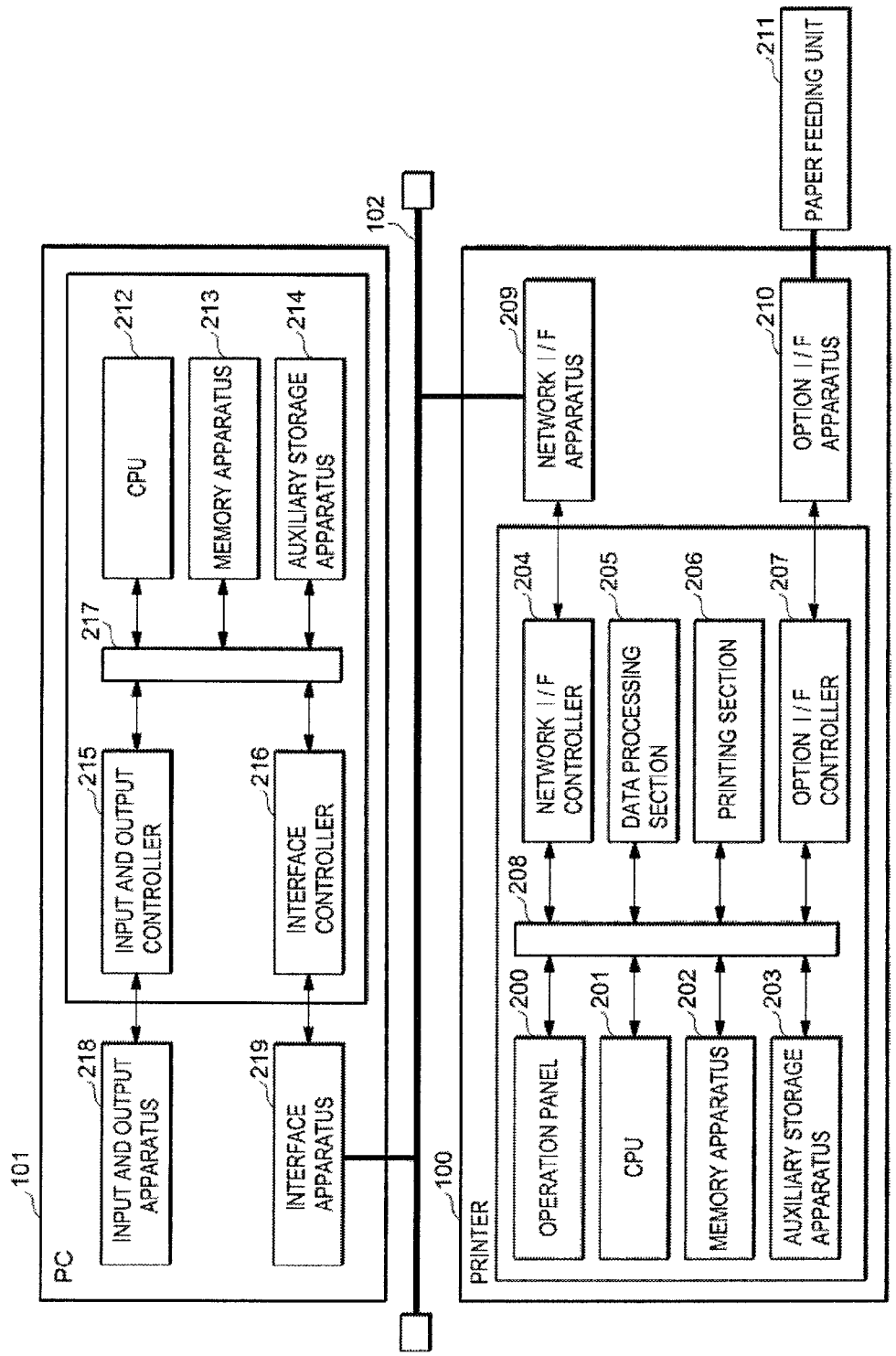
FIG. 3 is a structure diagram of an image forming system.

FIG. 3 is a structure diagram of an image forming system.

As shown by FIG. 3, the printer 100 has an operation panel 200, CPU 201, a memory apparatus 202, an auxiliary storage apparatus 203, a network I/F controller 204, a data processing section 205, a printing section 206 and an option I/F controller 207.

They are connected respectively through a system bus 208.

The operation panel 200 displays a condition of the printer 100 and performs an input operation of the printer 100.

The auxiliary storage apparatus 203 stores data such as an identifier of the connected PC 101 and option identifiers of structure articles, namely, option apparatuses which are installed in the self apparatus, further stores different kinds of programs, that is, for example, hard disk.

The network I/F controller 204 controls a network I/F apparatus 209 that is connected with the personal computer 101.

The data processing section 205 performs a data process such as color space transformation and a binarization process in order to print.

The printing section 206 performs a print of data that is processed through the data processing section 205.

The option I/F controller 207 controls an option I/F apparatus 210 that is connected to a structure article, namely, an option apparatus.

The CPU 201 performs different kinds of controls on the basis of data that is stored in the memory apparatus 202 and the auxiliary storage apparatus 203.

The CPU 201 confirms an apparatus structure of the printer 100 through the option I/F controller 207 and the option I/F apparatus 210 in a start time and every constant time process of the printer 100, in the case that the apparatus structure of the printer 100 is changed, it generates apparatus structure change information to adapt a printer driver of the connected personal computer 101 to a new apparatus structure, and sends it to the personal computer 101 through the network I/F apparatus 209.

In the present embodiment, the option apparatus that is installed at the beginning is regarded as a paper feeding unit 211 concretely.

The paper feeding unit 211 is a predetermined option apparatus that becomes a foundation structure of the printer 100.

As shown by FIG. 3, the PC 101 has a CPU 212, a memory apparatus 213, an auxiliary storage apparatus 214, an input and output controller 215 and an interface controller 216.

They are connected respectively through a system bus 217.

The input and output controller 215 controls an input and output apparatus 218.

The input and output apparatus 218 is an apparatus that performs an input and output of data, and is, for example, a keyboard and a display.

The interface controller 216 controls an interface apparatus 219 that is connected to the printer 100.

The auxiliary storage apparatus 214 is, for example, a hard disc, stores different kinds of programs such as a printer driver, installer of the printer driver and the like.

The data base is contained in the printer driver, in the data base, a details means such as function, shape and the like of an predetermined option apparatus (for example, the paper feeding unit 211) capable of installing in the printer 100, is recorded capable of searching through the option identifiers (for example, "Tray 1") that are assigned to the predetermined option apparatus.

A definition file is contained in the printer driver, in the definition file, option identifiers of structure articles, namely, option apparatuses that are installed in the connected printer 100, are recorded.

The CPU 212 performs a control on the basis of programs and data that are stored in the memory apparatus 213 and the auxiliary storage apparatus 214.

The programs contain a printer driver and an installer, the CPU 212 installs a printer driver through an installer; and sends PC information, that is, computer name and IP address to the printer 100 after the installation is completed through the interface apparatus 219.

The CPU 212 takes out a structure article, namely, a details means of the option apparatus that is recorded in the data base by regarding the option identifier written in the definition file of the printer driver as a key, and makes the details means perform a display of a setting scene and the like.

Figure 1:
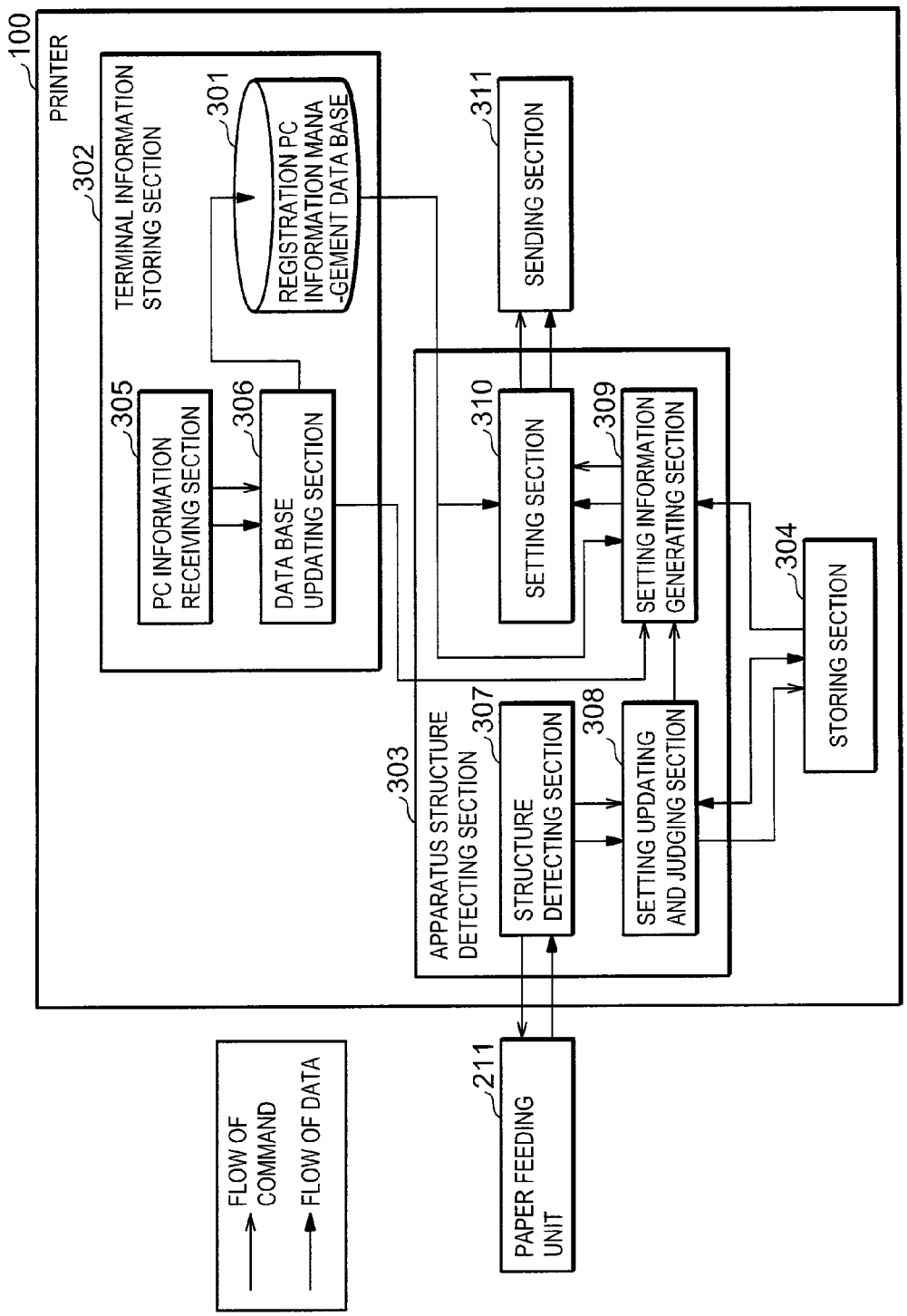
FIG. 1 is a function block diagram (embodiment 1) of a printer 100.

FIG. 1 is a function block diagram of a printer 100 in embodiment 1.

The printer 100 comprises a terminal information storing section 302, an apparatus structure detecting section 303, a storing section 304 and a sending section 311.

The terminal information storing section 302 includes a PC information receiving section 305, a data base updating section 306 and a registration PC information management data base 301.

The PC information receiving section 305 judges whether or not the received information is PC information for specifying a PC and the like.

The apparatus structure detecting section 303 and the data base updating section 306 are function sections that are constructed through executing the program by the CPU 201 that is stored in the auxiliary storage apparatus 203 shown by FIG. 3.

The data base updating section 306 newly registers the PC information of the personal computer 101 that is received through the PC information receiving section 305 into the registration PC information management data base 301, or updates registration content about the personal computer 101 in the registration PC information management data base 301.

The update of the registration content is, for example, a change of the IP address of the PC 101.

Figures 4, 5:
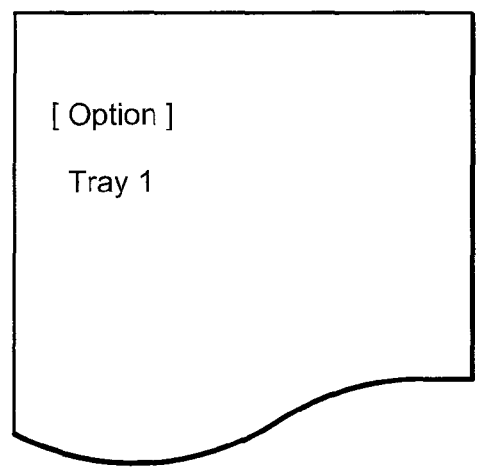
FIG. 4 is an example of a registration PC information management data base 301.
FIG. 5 is an example of a definition file of a printer driver.

FIG. 4 is an example of a registration PC information management data base 301.

In the registration PC information management data base 301, as shown by FIG. 4, an ID 400 of the PC 101, a computer name 401, an IP address 402, a file name 403 and a file path 404 are registered.

The ID 400 of FIG. 4 is a number that is assigned in the case that PC information is registered to the registration PC information management data base 301.

The computer name 401 is a name of the registered PC 101.

The IP address 402 is an IP address of the registered PC 101.

The file name 403 is a definition file name that defines information of the setting scene of the printer driver.

The file path 404 is a path of a place where a file of the file name 403 is stored in the PC 101.

The printer 100 confirms an apparatus structure of the printer 100 in a start time and every constant time process of the printer 100, and in the time that the apparatus structure of the printer 100 is changed, it generates apparatus structure change information to adapt a printer driver of the connecting personal computer 101 to a new apparatus structure, and has a function to send it to the PC 101, but the core of the function is taken by the apparatus structure detecting section 303.

The apparatus structure detecting section 303 is composed of a structure detecting section 307, a setting updating and judging section 308, a setting information generating section 309 and a setting section 310.

The structure detecting section 307 inquires option identifiers of all the structure articles, namely, option apparatuses that are installed in the printer 100 with respect to the option I/F apparatus 210 in a start time and every constant time intervals, and obtains option identifiers of all the structure articles, namely, the option apparatuses.

The setting updating and judging section 308 newly stores the option identifiers in the storing section 304 when the option identifiers received through the structure detecting section 307 have not been stored in the storing section 304.

Further, when the previously installed option apparatus is taken off, because the structure detecting section 307 has not obtained the option identifier, the option identifier is deleted from the storing section 304.

When the information stored in the storing section 304 is different from the information detected by the structure detecting section 307 this time, it may also overwrite this time detection information on the information of the storing section 304.

The setting information generating section 309 sets only option identifiers in the definition file that is sent to the PC 101.

The setting information generating section 309 also generates an overwriting program for overwriting the definition file in the existing definition file of the printer driver.

The setting section 310 obtains discrimination information of the registered PC 101 from the registration PC information management data base 301, and makes the sending section 311 send apparatus structure change information to the PC 101 by instructing the sending section 311 so as to send the apparatus structure change information containing the definition file and the overwriting program that are generated by the setting information generating section 309 with respect to the PC 101.

The CPU 212 of the PC 101 executes the received overwriting program, and executes an overwriting process of the received definition file in the definition file of the installed printer driver.

FIG. 5 is an example of a definition file of a printer driver generated by the setting information generating section 309.

"[Option]" of FIG. 5 is a name of a section of a file, and represents that the following continuous English numbers are option identifiers of the option apparatuses that are installed in the printer 100.

That is, "Tray 1" of the second line is an option identifier of a paper feeding unit that is a structure article, namely, an option apparatus of the printer 100, and it can be judged through the definition file that only one paper feeding unit that is a predetermined option apparatus is installed in the printer 100.

In the printer driver that is installed in the PC 101, as stated above, a details means such as function, shape and the like of the predetermined option apparatus of the printer 100 and a name of the option apparatus are included in a data base that records in option identifier unit of the option apparatus.

Figure 6:
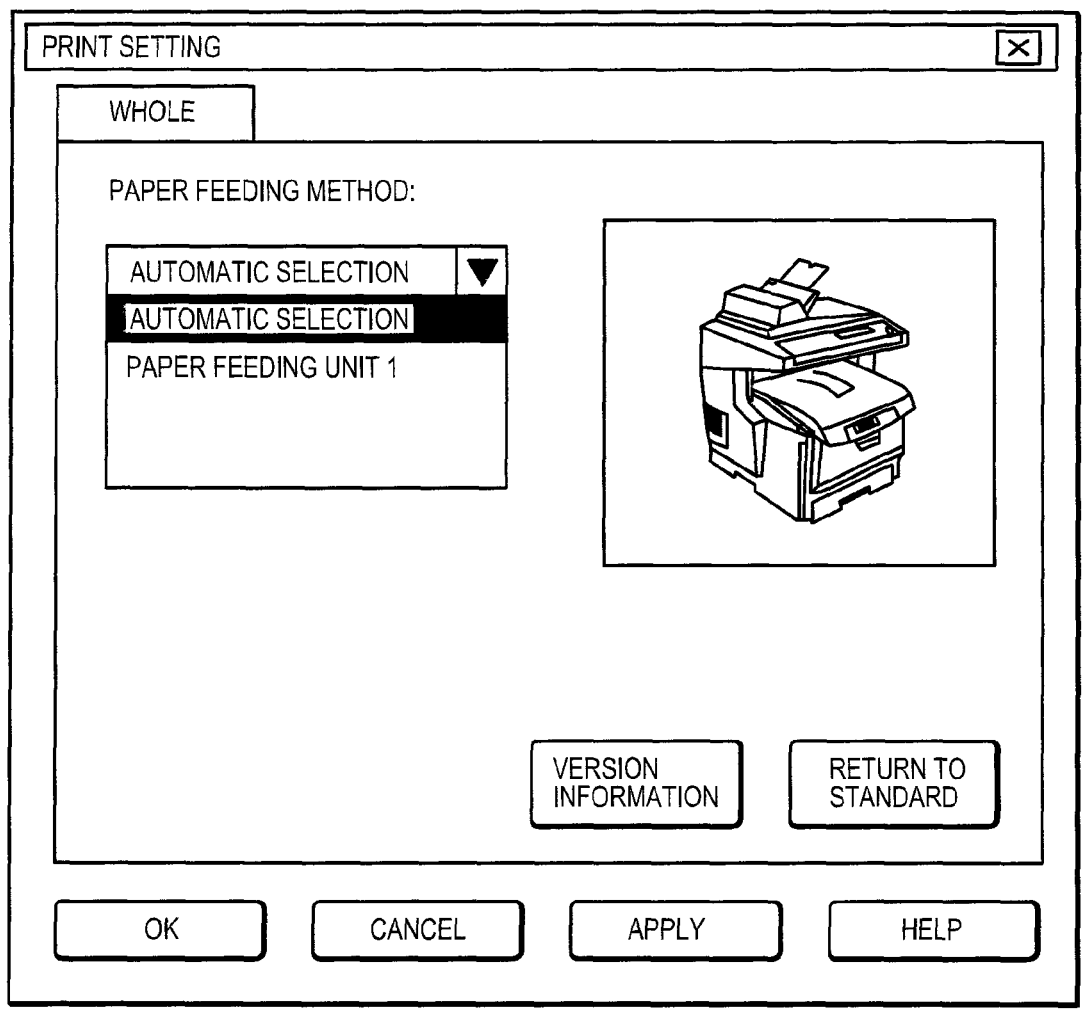
FIG. 6 is a setting scene example of a printer driver.

FIG. 6 is a setting scene example in which a details means of the paper feeding unit is incorporated and displayed through the printer driver on the basis of the definition file shown by FIG. 5, and in which an appearance diagram of the printer, in which the shape measure of the paper feeding unit is reflected, is displayed.

(Explanation of Operation of Embodiment 1)

It is to explain about operation of embodiment 1 of the present invention by referring to FIG. 7 to FIG. 11 in detail.

Figure 7:
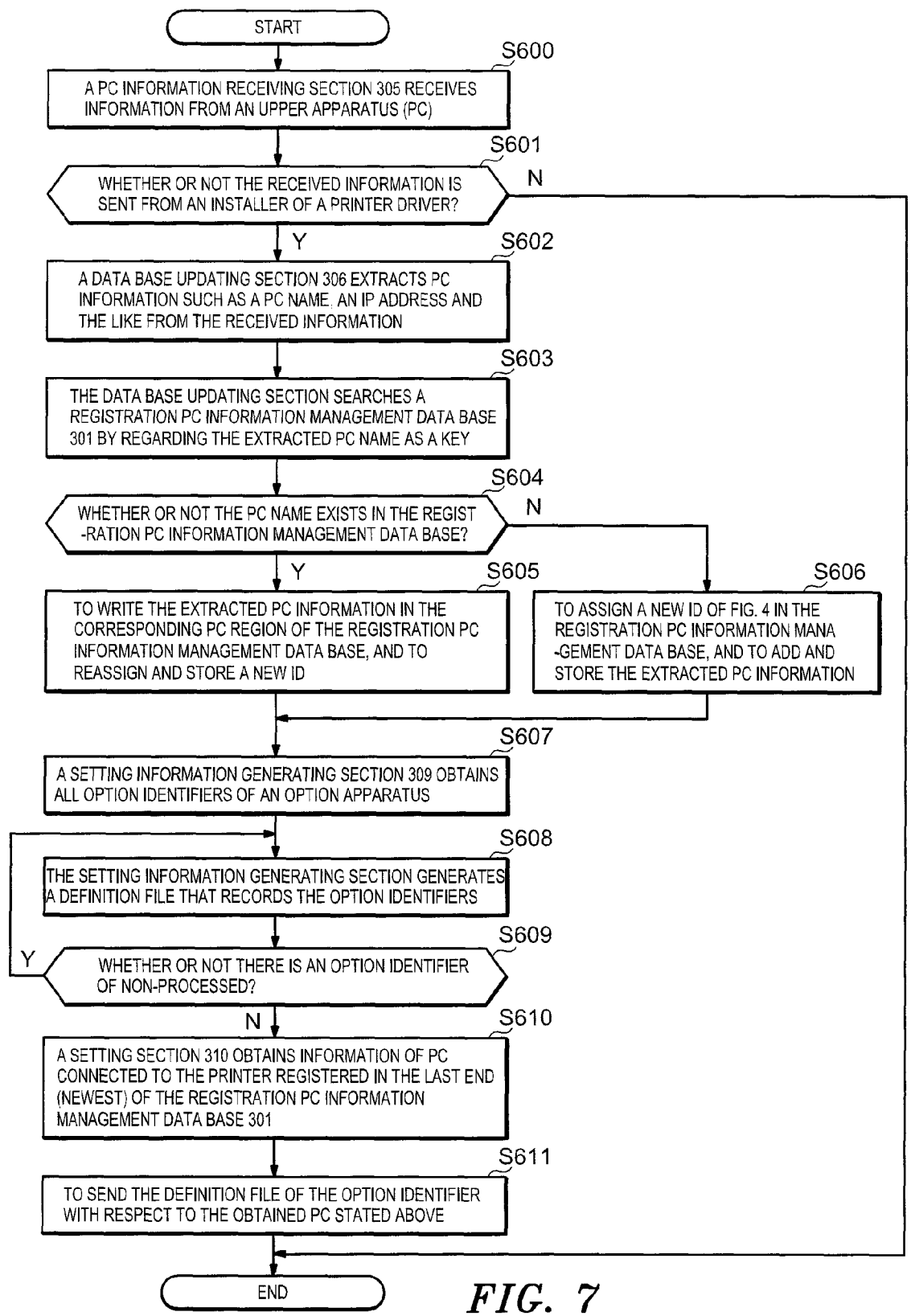
FIG. 7 is a flow chart for explaining a series of operation of a printer when a PC 101 and a printer 100 of embodiment 1 are connected for the first time.

FIG. 7 is a flow chart for explaining a series of operation of the printer 100 when a printer driver of the printer 100 is installed (for example, when a PC 101 and a printer 100 are connected for the first time).

At this time, in the printer 100, only one paper feeding unit that has an option identifier "Tray 1" is installed.

When the PC 101 and the printer 100 are connected for the first time, PC information is sent to the printer 100 from the PC 101.

Step S600

The PC information receiving section 305 receives information that is sent from the PC 101.

Step S601

The PC information receiving section 305 judges whether or not the received information is information that is sent from an installer of the printer driver use (in the concrete, whether or not it meets a fixed format).

If it is judged that the received information is information that is sent from the installer of the printer driver use, Step S602 is reached; otherwise a series of initial operation is completed.

Step S602

The data base updating section 306 extracts a computer name and an IP address of the PC 101, and definition file, storing destination and the like of the printer driver as PC information from the information that is received by the PC information receiving section 305.

Step S603

The data base updating section 306 searches the registration PC information management data base 301 by regarding the extracted computer name as a key.

Step S604

As a result of search, if there is a computer name of the received information in the registration PC information management data base 301, Step S605 is reached; otherwise Step S606 is reached.

Step S605

The data base updating section 306 updates information of the computer name region in the registration PC information management data base 301 by the extracted information, reassigns a new ID and stores it.

(For example, if the computer name is served as "COMPUTER 5", in table of FIG. 4, information of "COMPUTER 5" line is received in Step S600, and is all updated according to the extracted information in Step S602, the ID 400 is reassigned a value of new registration from a value of "1".)

Step S606

The data base updating section 306 registers the extracted information through Step S602 in the registration PC information management data base 301 (referring to FIG. 4). The ID 400 is assigned in added number.

Step S607

The setting information generating section 309 obtains an option identifier "Tray 1" that is maintained in the storing section 304.

Step S608

The setting information generating section 309 generates a definition file in which the option identifier "Tray 1" is recorded.

In the case that there are plural option apparatuses, they are additionally recorded in the generated definition file.

FIG. 5 shows a generated definition file.

Step S609

The setting section 310 confirms whether or not a process about option identifiers of self apparatus to reflect in a printer driver of the PC 101 is executed for all option identifiers obtained in Step S607 by the setting information generating section 309. If it is not executed all, Step S610 is reached; and if there is an option identifier of non-processed, Step S608 is reached.

Step S610

The setting section 310 obtains information of the PC 101 that is registered in the last end (newest) of the registration PC information management data base 301 (that is, the information is received in Step S600, so the information whose number of the ID 400 is the biggest).

Step S611

In order to send the definition file that is generated in Step S608 with respect to the PC 101 of Step S609, the setting section 310 outputs an instruction to the sending section 311, and the sending section 311 sends the definition file to the PC 101.

Then, the CPU 212 sets an initial definition file on the basis of the received definition file in the PC 101; a series of initial operation is completed.

Figure 8:
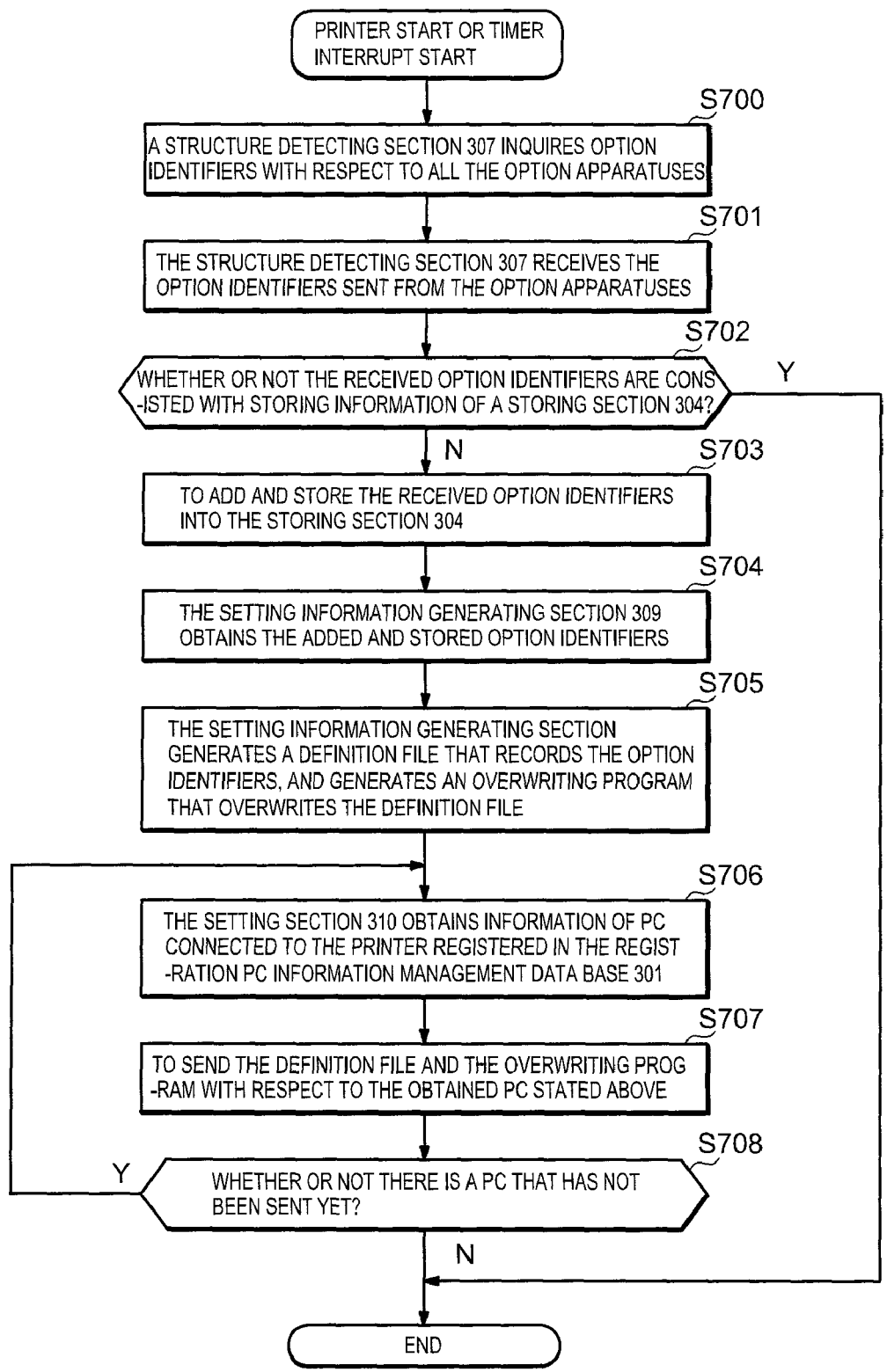
FIG. 8 is a flow chart for explaining a series of operation in a start time and every constant time process of a printer 100 of embodiment 1.

FIG. 8 is a flow chart for explaining a series of operation of detecting whether or not there is a change of apparatus structure in the next start time and every constant time process of a printer 100, and sending apparatus structure change information to all the connected PC 101 in the time that it is judged there is a change.

In the printer 100, only one paper feeding unit 1 is installed that is an predetermined option apparatus, but now two paper feeding units are installed, and it is stored that there is only one option identifier of a paper feeding unit in the storing section 304.

Step S700

After the printer 100 is started, the structure detecting section 307 inquires option identifiers of all the structure articles, namely, option identifiers of the option apparatuses (in the present embodiment, two paper feeding units, namely, a paper feeding unit 1 and a paper feeding unit 2).

Step S701

The option I/F apparatus 210 replies "Tray 1" as an option identifier of the paper feeding unit 1 and "Tray 1" as an option identifier of the paper feeding unit 2 to the structure detecting section 307.

Step S702

The setting updating and judging section 308 judges whether or not the option identifiers that are obtained through the structure detecting section 307 are consisted with the option identifiers that have already been stored in the storing section 304.

When it is judged that they are not consisted, Step S703 is reached; when it is judged that they are consisted, a series of operation is completed.

Step S703

The setting updating and judging section 308 makes the storing section 304 store the newly obtained option identifiers. At that time, because there are two "Tray 1"s, "Tray 2" is stored as the option identifier of the paper feeding unit 2 that is newly installed in this time.

Step S704

The setting information generating section 309 obtains the option identifier "Tray 2" that is newly obtained except "Tray 1".

Step S705

The setting information generating section 309 generates a definition file that records the option identifiers "Tray 1" and "Tray 2", and generates an overwriting program that overwrites the definition file, and then sends them to the setting section 310.

Figure 9:
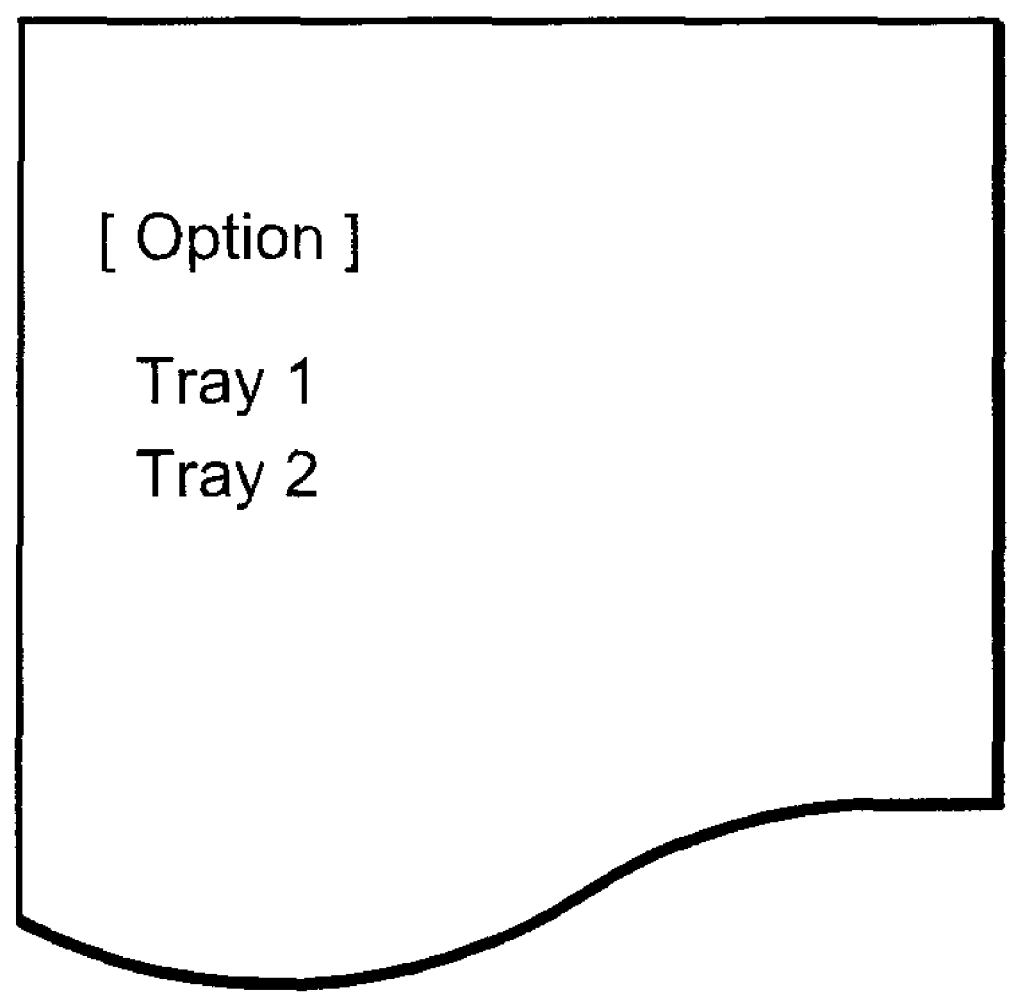

FIG. 9 shows a generated definition file.

Step S706

The setting section 310 obtains PC information (referring to FIG. 4) of the PC 101 connected to the printer that is registered in the registration PC information management data base 301 inside of the terminal information storing section 302.

Step S707

The setting section 310 instructs the sending section 311 to send apparatus structure change information containing the definition file that is generated in Step S705 and the overwriting program that overwrites the definition file with respect to the PC 101, and the sending section 311 sends the apparatus structure change information to the PC 101.

Step S708

The setting section 310 confirms whether or not the apparatus structure change information has been sent to all the PC 101 connected to the printer, if there is a PC 101 of non-sending, Step 5706 is reached; if it has been sent to all the PC 101, END is reached.

As stated above, the printer 100 completes a series of operation for sending apparatus structure change information to the PC 101 to change the printer driver so as to be adapted to the apparatus structure of self apparatus.

In the side of the PC 101, the CPU 212 overwrites the received definition file on the initial definition file by using the overwriting program. Thus, in the definition files of the printer driver, "Tray 1" and "Tray 2" are defined.

Figure 10:
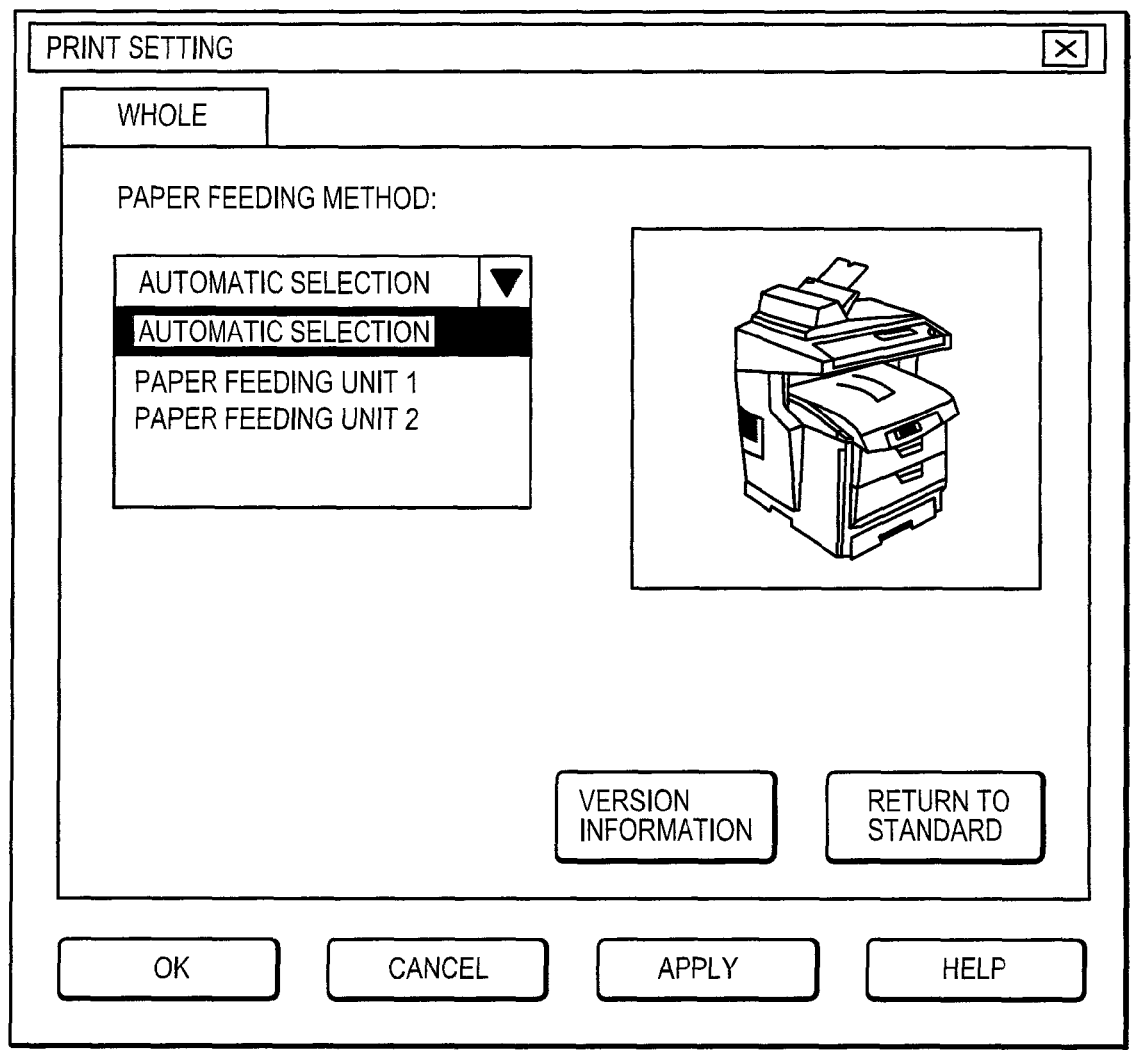
FIG. 10 is a setting scene example of a printer driver after a definition file that is shown by FIG. 9 is overwritten.

FIG. 10 is a setting scene example of a printer driver after a definition file shown by FIG. 9 is overwritten.

In FIG. 10, an appearance diagram is shown in which a shape measure of the paper feeding unit 1 and the paper feeding unit is reflected.

As shown by FIG. 10, it is possible to select a paper feeding unit as a paper feeding method.

Figure 11:
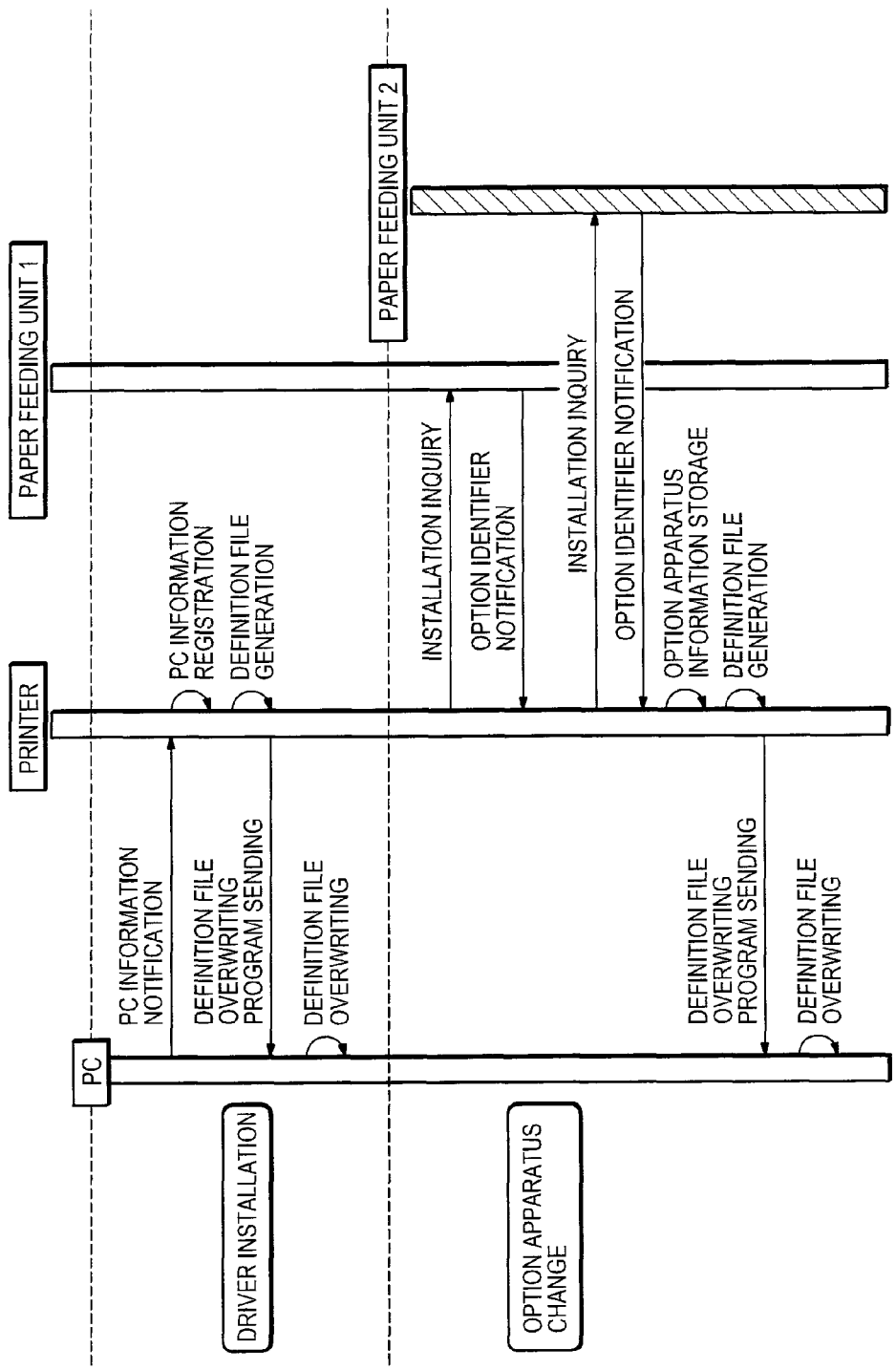
FIG. 11 is a diagram that completes a flow of signal among a PC 101, a printer 100, a paper feeding unit 1 and a paper feeding unit 2 of embodiment 1 in the case that a printer driver is installed and the case that an installation condition of an option apparatus is changed.

FIG. 11 is a diagram that completes operation that is shown by FIG. 7 and FIG. 8 of embodiment 1 as a flow of signal among a PC 101, a printer 100, a paper feeding unit 1 and a paper feeding unit 2 in the case that a printer driver is installed and the case that an installation condition of an option apparatus is changed.

Moreover, operation shown by FIG. 8 is also applied as an application example in the case to delete the predetermined option apparatus and the like.

Figure 12:
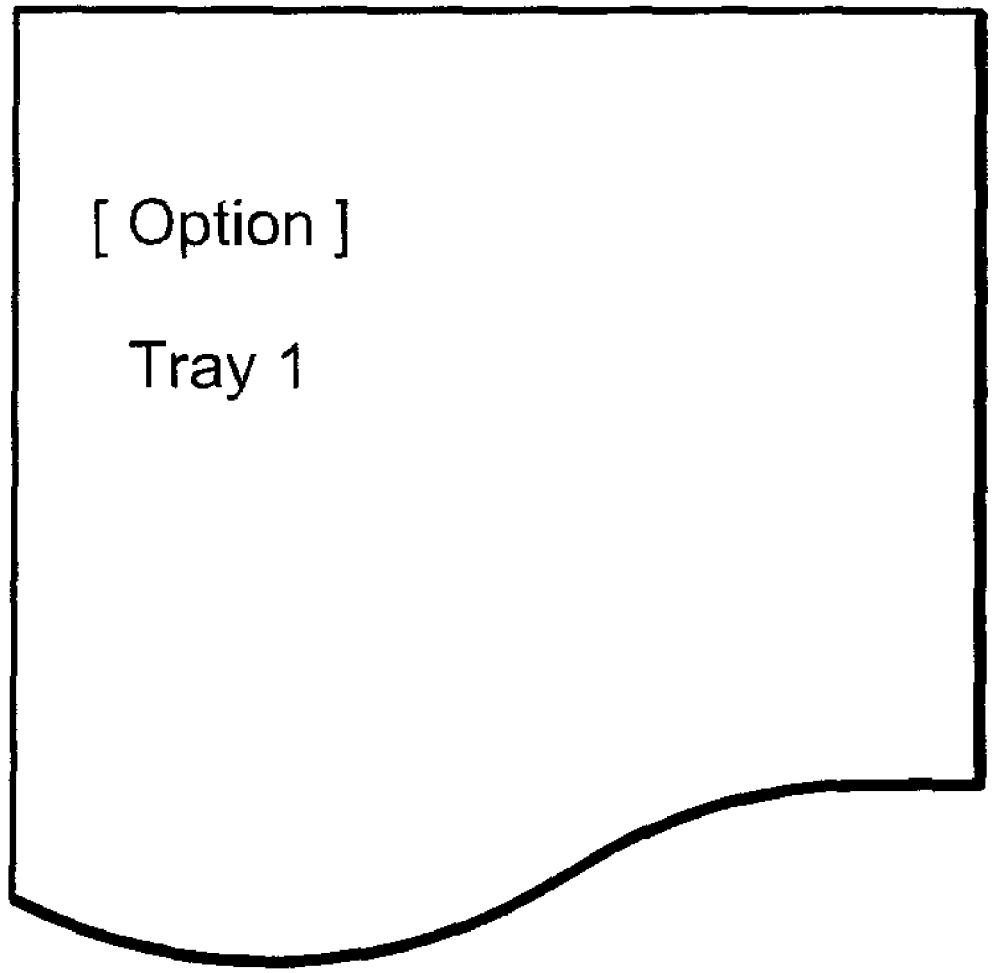
FIG. 12 is a reference example of a definition file of a printer driver.

For example, in the case that one paper feeding unit 1 is take off after a definition file shown by FIG. 9 is applied, the definition file that is sent from the printer 100 to the PC 101 is recorded as shown by FIG. 12.

(Effect of Embodiment 1)

Even though in the initial time in which the printer and the PC are connected capable of communicating, and in the time that the structure article, namely, option apparatus is newly installed or taken off, because the apparatus structure change information, that contains a definition file recording option identifiers of objective structure articles and an overwriting program of the definition file, is automatically sent from the printer to the PC, it is possible to update a printer driver without performing a selection of structure articles in the PC through user.

<Embodiment 2>

In the present embodiment, it is to explain about an example that automatically sends the apparatus structure change information that contains a definition file recording option identifiers adding a module file to record a details means of the option apparatus and an overwriting program for incorporating the definition file into the printer driver to the PC as an image processing apparatus, when the option apparatus (for example, a finisher and a duplex unit) that is not an predetermined option apparatus of the printer is newly installed in the printer as an image forming apparatus.

(Explanation of Structure of Embodiment 2)

In the printer driver that is installed in the PC, though a data base is contained for recording a details means of the predetermined option apparatus of the printer, it is difficult to previously record a details means about a newly developed option apparatus capable of installing in the printer in the data base of the PC. Therefore, in the present embodiment, an option module management data base 1400 is furnished for storing the details means of the option apparatus, and the details means information is sent to the PC when the newly developed option apparatus is installed.

Figure 13:
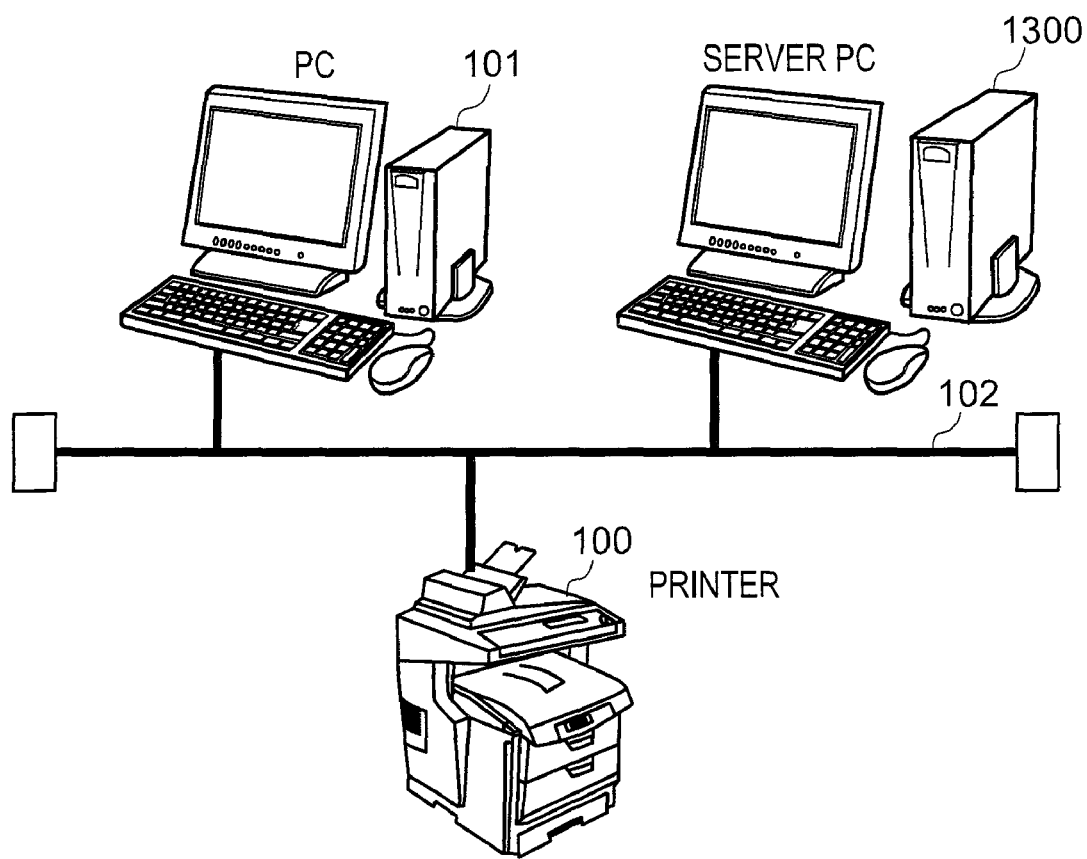
FIG. 13 is a connection diagram (embodiment 2) of an image forming system.

FIG. 13 is a connection diagram of an image forming system of the present embodiment.

In FIG. 13, the PC 101 and the printer 100 that are connected through the network 102 are respectively one altogether, which is the same as embodiment 1. However, in fact, plural numbers are connected altogether.

As shown by FIG. 13, in the present embodiment, a server PC 1300 is added and furnished as a server use information processing apparatus in the image forming system of FIG. 2.

The server PC 1300 has the option module management data base 1400.

Figure 14:
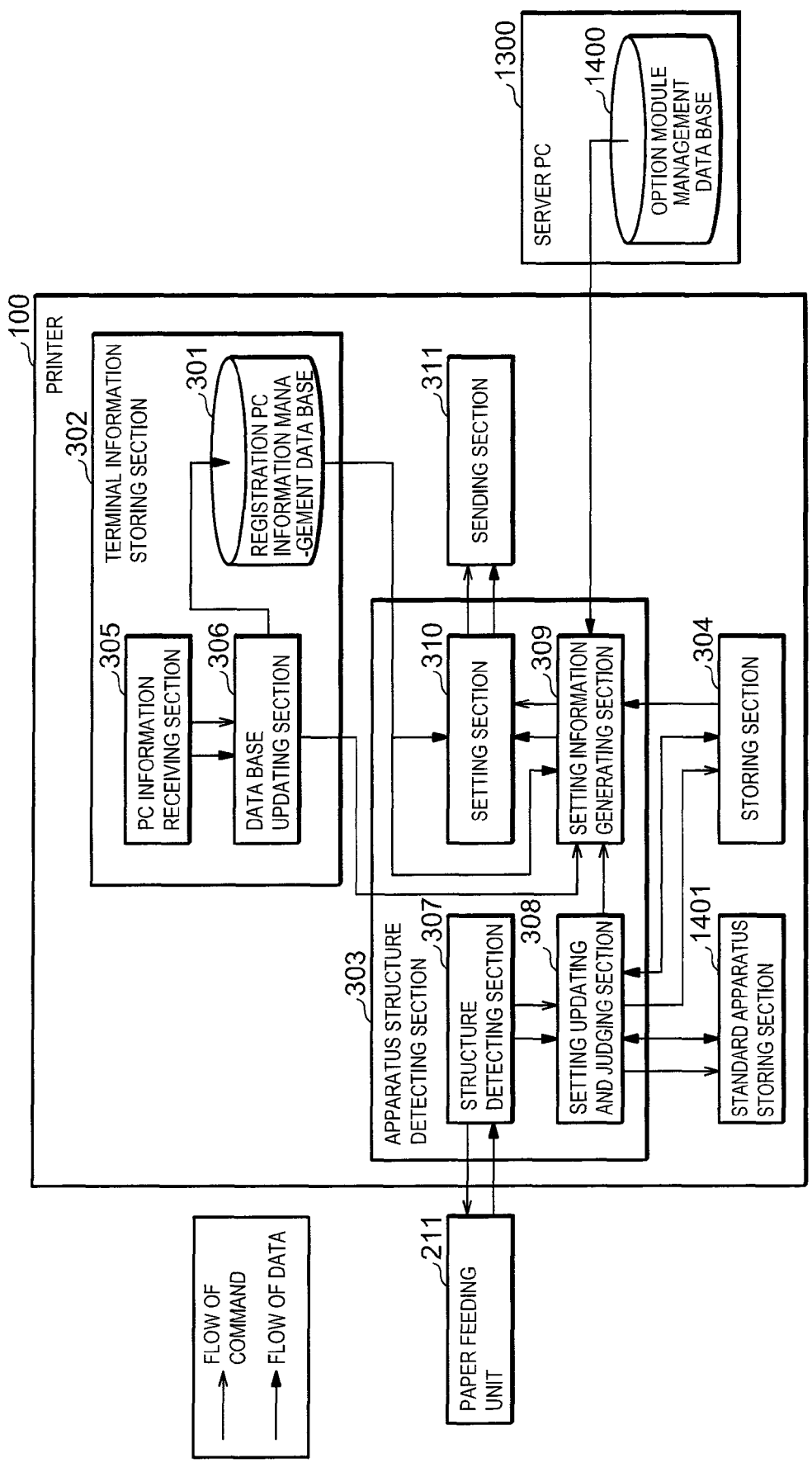
FIG. 14 is a function block diagram (embodiment 2) of a printer 100.

FIG. 14 is a function block diagram of a printer 100 of the present embodiment.

As shown by FIG. 14, in the present embodiment, the server PC 1300 and the option module management data base 1400 are added and furnished.

Further, in the present embodiment, a standard apparatus storing section 1401 is also furnished as well as the storing section 304 for storing option identifiers of option apparatuses in the printer 100.

After an installation is detected by the structure detecting section 307, similarly to embodiment 1, option identifiers of option apparatuses are stored in the storing section 304. However, option identifiers of the predetermined option apparatuses of the printer 100, for example, "Tray 1" and "Tray 2" are stored as an initial setting in the standard apparatus storing section 1401. Then, the standard apparatus storing section 1401 is used in the case to judge whether or not the option apparatus that is detected by the structure detecting section 307 is a predetermined option apparatus.

In the option module management data base 1400, details means information of all the newly developed option apparatuses capable of installing in the printer 100 are stored, and storing content is updated whenever the option apparatus is newly developed and supplied.

Figure 15:
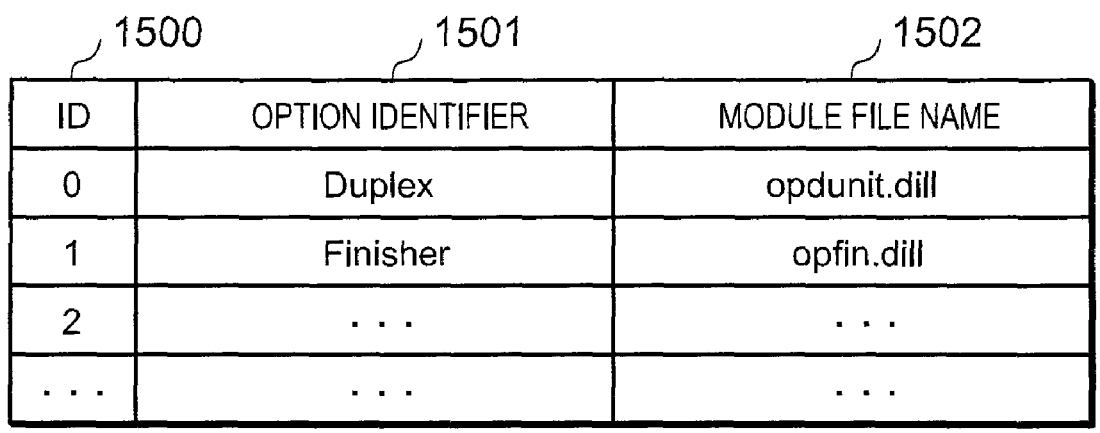
FIG. 15 is an example of an option module management data base 1400.

FIG. 15 is an example of an option module management data base 1400.

As shown by FIG. 15, in the option module management data base 1400, an ID 1500, an option identifier 1501, a module file name 1502 and the module file are stored.

The ID 1500 is a number that is assigned in the time of registration of information of the option apparatus to the option module management data base 1400. The option identifier 1501 is an option identifier of the option apparatus capable of installing in the printer 100. The module file name 1502 is a name of a module file that records details means necessary for using structure articles of the printer 100 in the printer driver. The module file contains details means information of respective option apparatuses.

(Explanation of Operation of Embodiment 2)

It is to explain a difference from operation of embodiment 1 by referring to FIG. 16 to FIG. 19.

Figure 16:
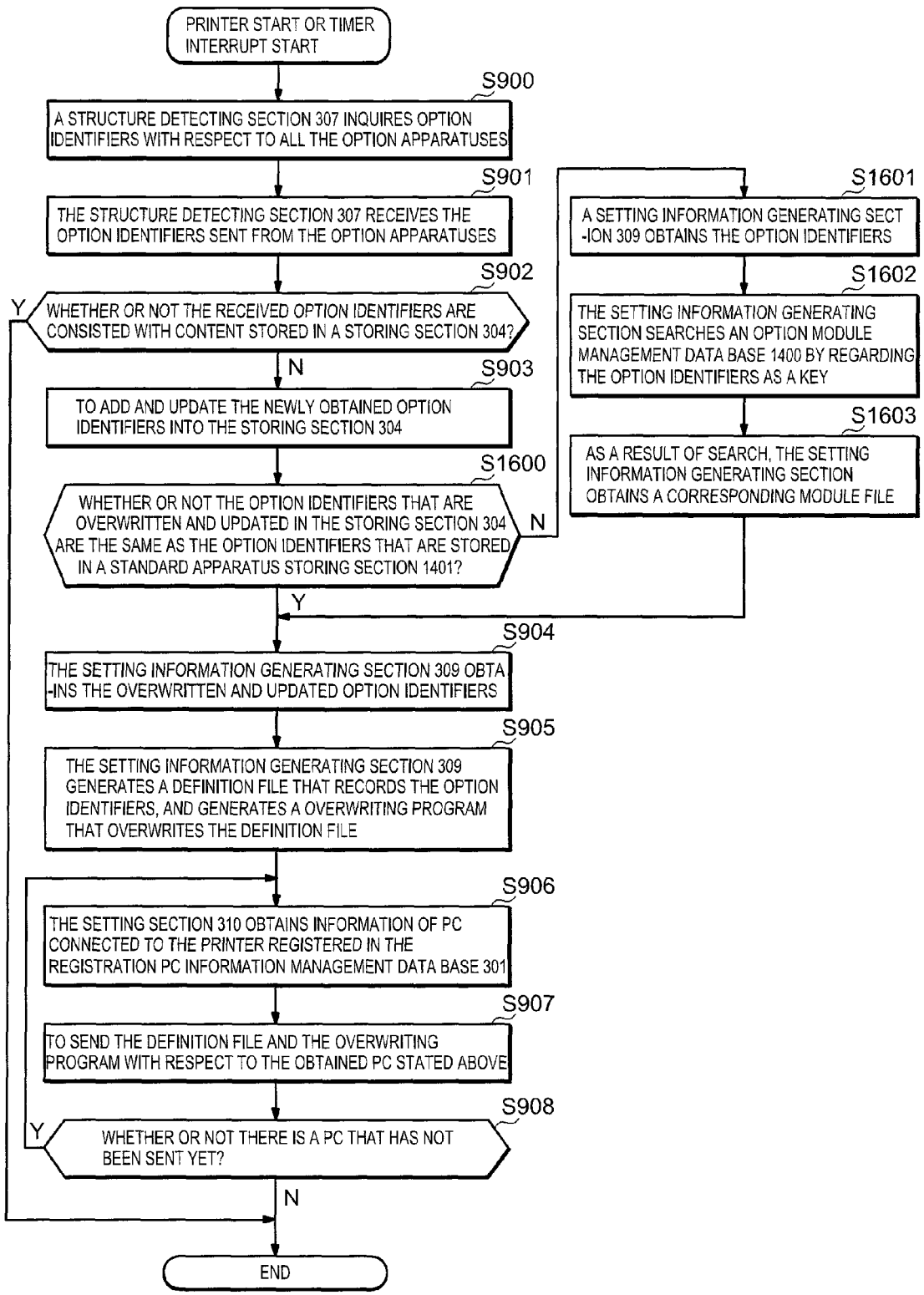
FIG. 16 is a flow chart for explaining a series of operation in a start time and every constant time process of a printer 100 of embodiment 2.

FIG. 16 is a flow chart for explaining a series of operation that the printer detects whether or not there is a change of apparatus structures in the next start time and every constant time process, after judged that there is a change, sends apparatus structure change information to all the connected PC 101s (when the newly developed option apparatus corresponds to installation).

In the printer 100, the paper feeding unit 1 and the paper feeding unit 2 of the predetermined option apparatuses, and a newly registered finisher are installed. Here, the finisher is not the predetermined option apparatus of the printer 100, but a newly developed option apparatus.

Step S900

After a timer interrupt is performed, the structure detecting section 307 inquires of all the option apparatuses (in the present embodiment, containing the paper feeding units 1, 2 and the finisher) about option identifiers.

Step S901

The paper feeding unit 1 replies "Tray 1" as an option identifier, the paper feeding unit 2 replies "Tray 1" as an option identifier, and the finisher replies "Finisher" as an option identifier, to the structure detecting section 307.

The setting updating and judging section 308, because it receives two option identifiers "Tray 1" at that time, changes the one into "Tray 2".

Step S902

The setting updating and judging section 308 judges whether or not the option identifiers obtained by the structure detecting section 307 are respectively consisted with option identifiers that have already been stored in the storing section 304. If they are not consisted, Step S903 is reached; and if they are consisted, a series of operation is completed.

Step S903

The setting updating and judging section 308 additionally stores the option identifier "Finisher" that is newly obtained information in the storing section 304.

Step S1600

The setting updating and judging section 308 judges whether or not the option identifier that is stored in this registration in the storing section 304 is the same as any one of option identifiers that are stored in a standard apparatus storing section 1401. If they are the same, Step S904 is reached; and if they are not the same, Step S1601 is reached. At this time, because the finisher is not a predetermined option apparatus, but is a newly developed option apparatus, Step S1601 is reached.

Step S1601

The setting information generating section 309 obtains "Finisher" that is an option identifier of the finisher.

Step S1602

The setting information generating section 309 instructs the server PC 1300 to search the option module management data base 1400 by regarding the option identifier "Finisher" as a key.

Step S1603

As a result of search, the setting information generating section 309 obtains a corresponding module file name (here, "opfin.dll"), and continuously obtains the corresponding module file through the server PC 1300.

Step S904

The setting information generating section 309 obtains all the option identifiers that are stored in the storing section 304.

Step S905

The setting information generating section 309 generates a definition file (referring to FIG. 17) that records the option identifiers by using the module file that is obtained in the Step S1603, and generates an overwriting program that overwrites the definition file and the module file.

Figure 17:
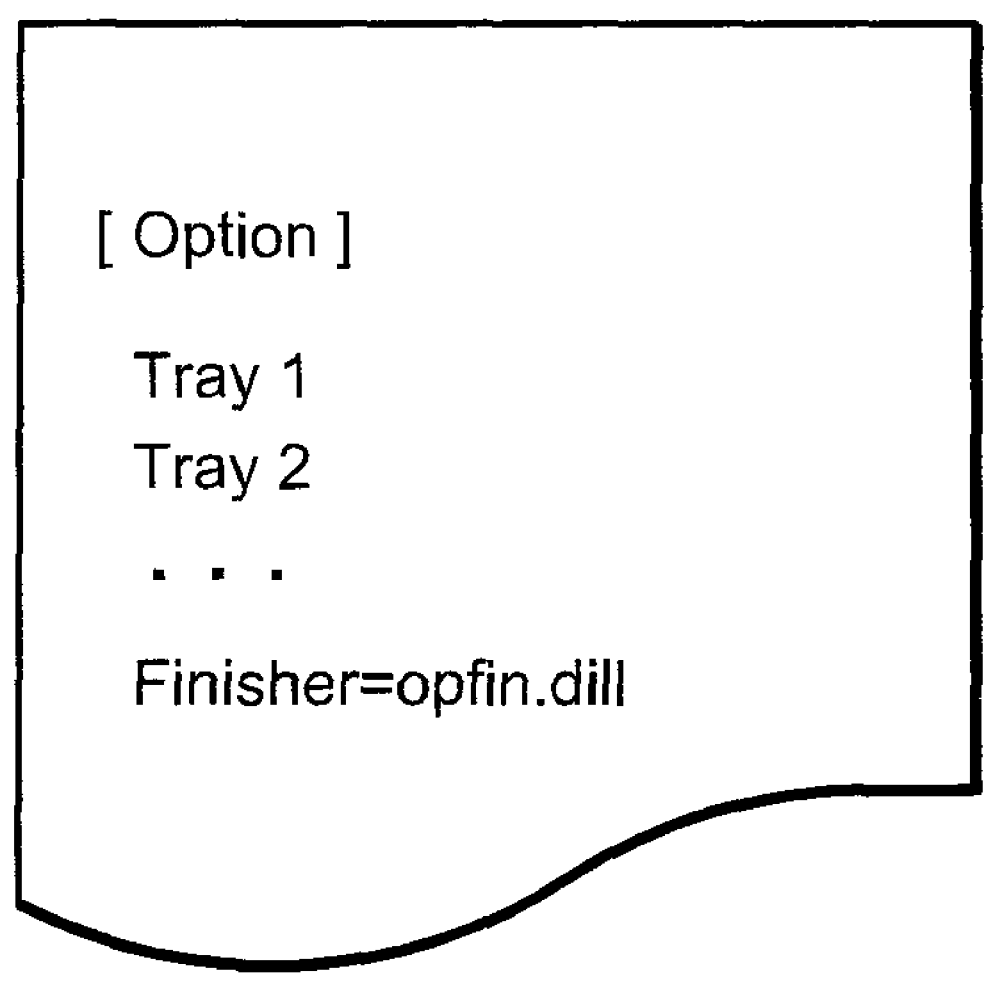

As shown by FIG. 17, "Tray 1" and "Tray 2" are option identifiers that have been stored in the storing section; because the newly detected option identifier "Finisher" has not been stored in the standard apparatus storing section 1401, it is judged that it is the newly developed option apparatus, and the module file whose name is "opfin.dll" is obtained through the option module management data base 1400.

Step S906

The setting section 310 obtains information of the PC 101 connected to the printer that is registered in the registration PC information management data base 301.

Step S907

The setting section 310 instructs the sending section 311 to send apparatus structure change information containing the definition file that is generated in the Step S905, the module file that is obtained in the Step S1603 and the overwriting program that overwrites the information with respect to the PC 101 on the basis of PC information. The sending section 311 sends the apparatus structure change information to the PC 101.

Figure 18:
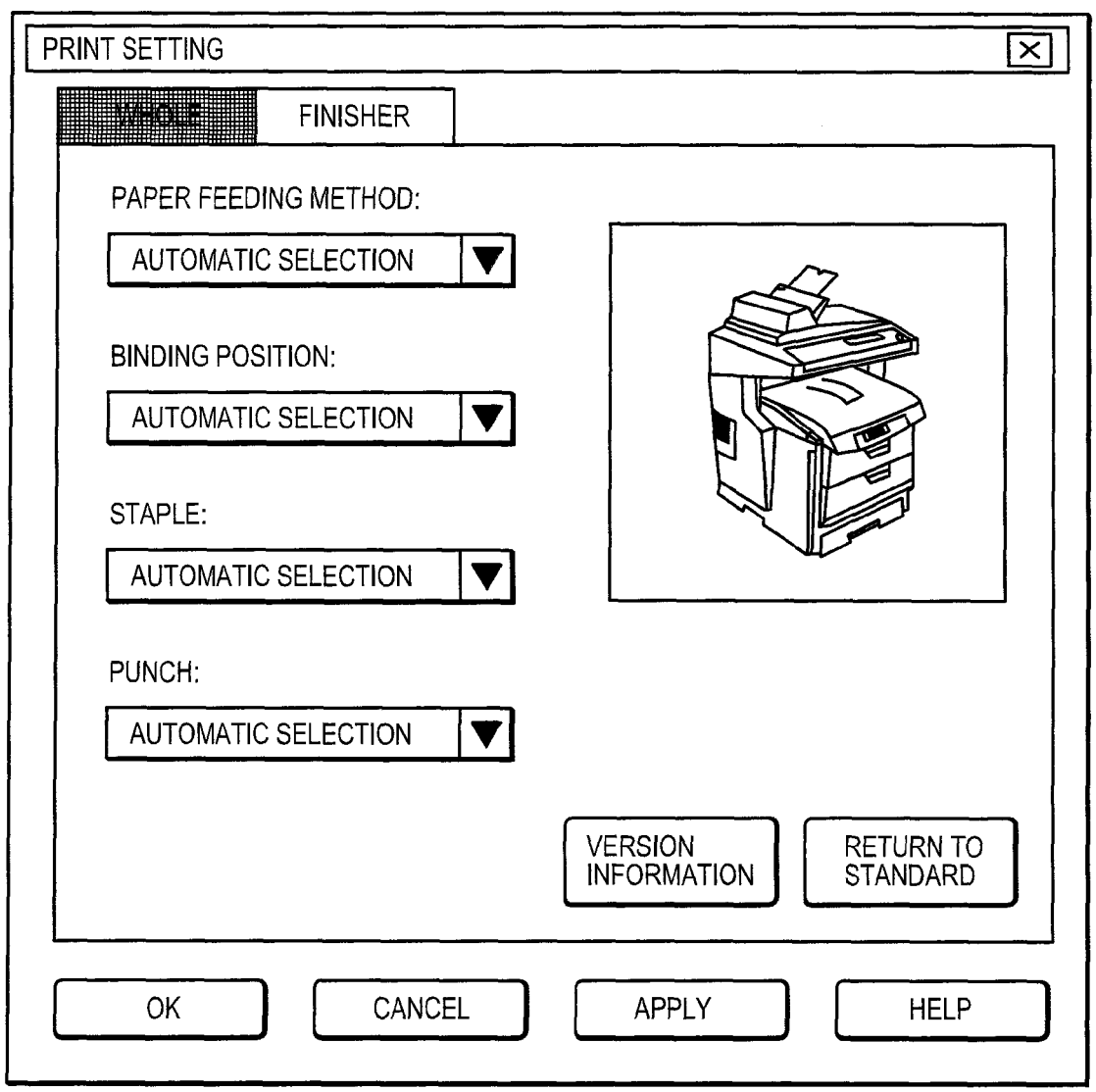
FIG. 18 is an example of setting scene of a printer driver after a finisher is installed.

The sent overwriting program is executed through the CPU 212 of the received PC 101, the definition file of the printer driver that is installed in the PC 101 is overwritten, and a module file that is necessary for using a function of the option apparatus (in the present embodiment, the finisher) that is newly added to the printer 100 in the printer driver is assigned to the printer driver A setting scene example of the printer driver when the definition file shown by FIG. 17 is applied is shown by FIG. 18.

As shown by FIG. 18, a tab is added to the setting scene, and it becomes possible to select a function of the finisher.

Step S908

The setting section 310 confirms whether or not the apparatus structure change information has been sent to all the PCs 101 connected to the printer, if there is a PC 101 to that it has not been sent yet, Step S906 is reached.

When the option apparatus that is newly and additionally installed is not a predetermined option apparatus, the corresponding module file that records the characteristic of the option apparatus as well as the definition file and the like are sent as apparatus structure change information with respect to the PC 101, and a series of operation to adapt to a new apparatus structure of self apparatus is completed.

Figure 19:
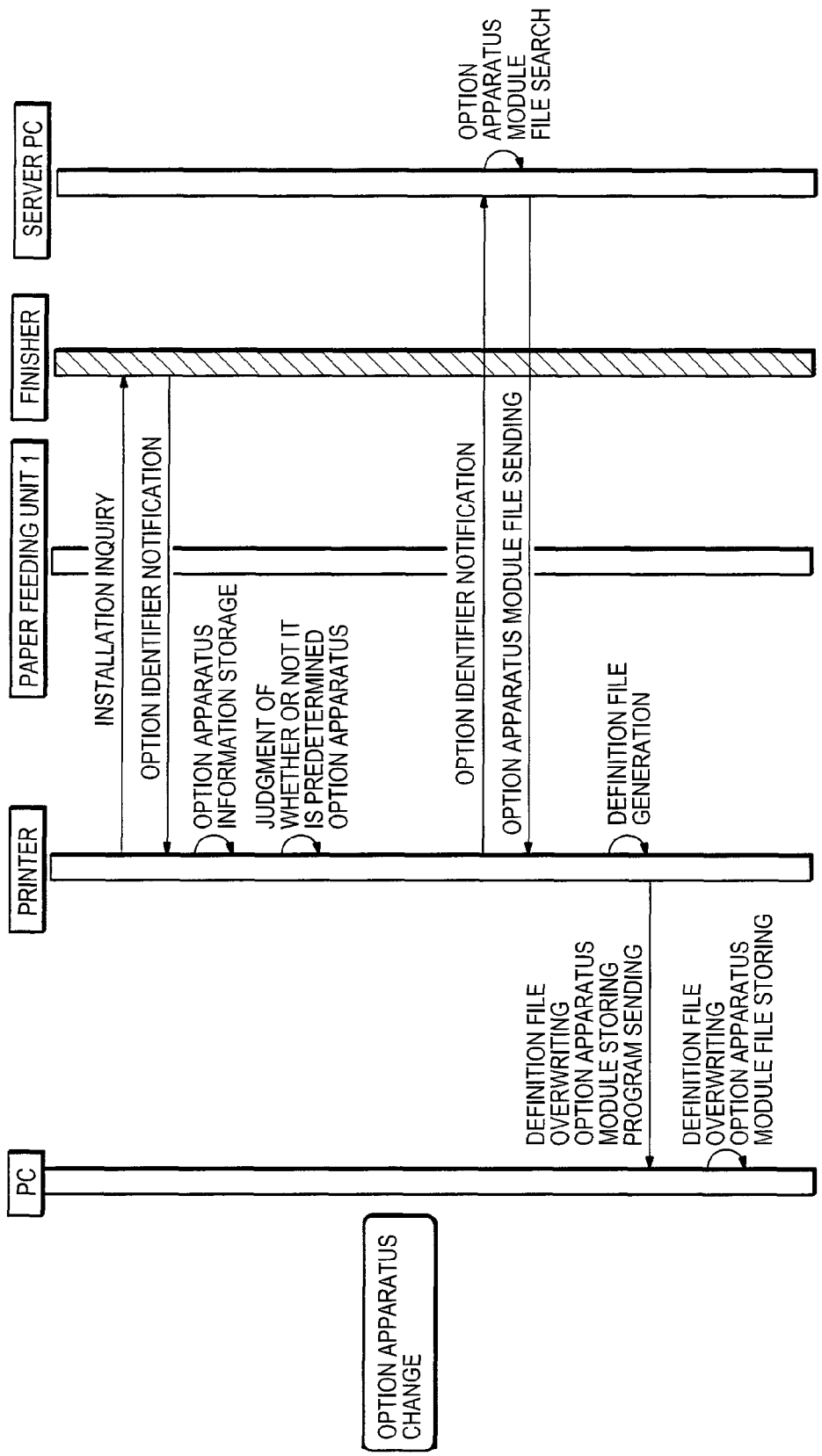
FIG. 19 is a diagram that completes a flow of signal among a PC 101, a printer 100, a paper feeding unit 1, a server PC 1300 and a finisher of embodiment 2 in the case that an installation condition of an option apparatus is changed.

FIG. 19 is a diagram that completes operation of embodiment 2 as a flow of signal among a PC 101, a printer 100, a server PC 1300 and a finisher after an installation condition of an option apparatus is changed.

(Effect of Embodiment 2)

According to embodiment 2 as stated above, even when the structure article that is newly added to the printer, namely, option apparatus is not the predetermined option apparatus, but the newly developed option apparatus, because the apparatus structure change information containing the module file that records details means of the new option apparatus is automatically sent from the printer to a PC, so it is possible to update a printer driver without performing a selection of structure article, namely, option apparatus in the PC, and without performing an input of details means information through user.

<Change Example>

In the present embodiment, it is to explain about an example for making a USB memory store the read image data, and storing apparatus structure change information containing a definition file that records option identifiers appending a module file recording details means of the scanner, and an overwriting program that incorporates the definition file into the printer driver in a inside storing section, when a scanner that is not a predetermined option apparatus is newly installed in the printer.

Figure 20:
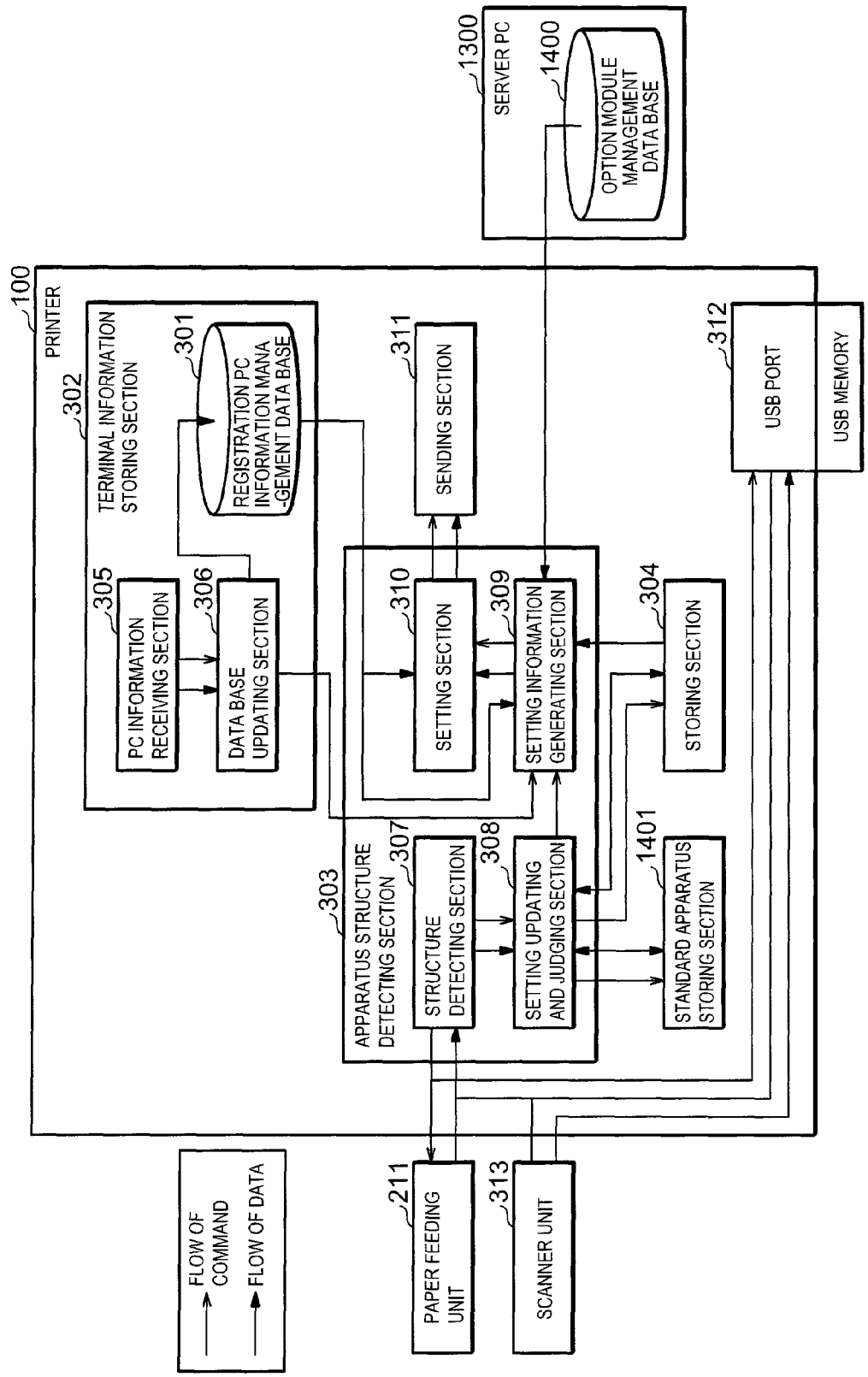
FIG. 20 is a function block diagram of a change example of the present invention.

FIG. 20 is a function block diagram of the printer 100 of the change example.

As shown by FIG. 20, a USB memory 312 that have a new USB port and a scanner unit 313 are added to the structure of embodiment 2 shown by FIG. 14.

In the present change example, because the structure detecting section 307 detects the scanner unit 313, the setting information generating section 309 generates apparatus structure change information containing a new definition file that contains an identifier of the scanner and the overwriting program. Then, the setting information generating section 309 stores the apparatus structure change information in the inside storing section 304.

The scanner unit 313 reads image data by scanning manuscript. The read image data is converted to a fixed form and is stored in the USB memory 312 through the USB port.

The USB memory 312 is taken off by user for using the image data.

The Utilization Possibility in Industry:

In the present embodiment, it is to explain about a printer. However, it is also apply to FAX, scanner simple substance and MFP (Multi Function Printer).

The present invention is not limited to the foregoing embodiments but many modifications and variations are possible within the spirit and scope of the appended claims of the invention.

What is claimed is:

1. An image forming apparatus capable of changing apparatus structure, comprising:

a storing section that previously stores apparatus structure of a self apparatus;

a structure detecting section that detects apparatus structure of the self apparatus;

a setting updating and judging section that judges whether the apparatus structure which is detected by the structure detecting section is consistent with the apparatus structure which has been stored in the storing section;

a setting information generating section that generates apparatus structure change information for adapting to a printer driver when the apparatus structure that is detected by the structure detecting section is judged not to be consistent with the apparatus structure that has been stored in the storing section; and a sending section that sends the generated apparatus structure change information to an image processing apparatus, wherein the setting updating and judging section further judges whether a newly developed option apparatus is included in the apparatus structure detected by the structure detecting section, and when it is judged to be included, the setting information generating section obtains information corresponding to the newly developed option apparatus from a server and generates the apparatus structure change information including the obtained information corresponding to the newly developed option apparatus.

2. The image forming apparatus according to claim 1, wherein the apparatus structure change information includes a definition file of structure articles that are used in the printer driver, and an overwriting program for overwriting the definition file.

3. The image forming apparatus according to claim 1, further comprising:

an information storing section in which a sending address of an image processing apparatus in which a printer driver is installed is stored, and a sending section that sends the apparatus structure change information to the image processing apparatus on the basis of the sending address.

4. An image forming system in which a server, an image processing apparatus in which a printer driver is installed, and an image forming apparatus capable of changing apparatus structure are connected such that they are capable of communicating wherein the image forming apparatus comprises:
a storing section that previously stores apparatus structure of a self apparatus;
a structure detecting section that detects apparatus structure of the image forming apparatus; and
a setting updating and judging section that judges whether the apparatus structure which is detected b the structure detectin section is consistent with the apparatus structure which has been stored in the storing section;
a setting information generating section that generates apparatus structure change information for adapting to a printer driver when the apparatus structure that detected by the structure detecting section is judged not to be consistent with the apparatus structure that has been stored in the storing section; and
a sending section that sends the generated apparatus structure change information to an image processing apparatus, wherein the server has an option management database for storing new registration option relation information, and wherein the setting updating and judging section further judges whether a newly developed option apparatus is included in the apparatus structure detected by the structure detecting section, and when it is judged to be included, the setting information generating section obtains information corresponding to the newly developed option apparatus from a server and generates the apparatus structure change information including the obtained information corresponding to the newly developed option apparatus; and wherein the image processing apparatus, after receiving the apparatus structure change information from the image forming apparatus, performs an inquiry to the server, and obtains a corresponding new option relation information.

5. The image forming system according to claim 4, wherein the apparatus structure change information includes a definition file of structure articles that are used in the printer driver, and an overwriting program for overwriting the definition file, wherein the overwriting program is executed on the image processing apparatus, and the definition file is overwritten in the printer driver by the overwriting program.

6. The image forming system according to claim 5, wherein the image forming apparatus further comprises:
an information storing section in which a sending address of an image processing apparatus in which a printer driver is installed is stored, and a sending section that sends the apparatus structure change information to the image processing apparatus on the basis of the sending address.

7. The image forming system according to claim 6, wherein the image processing apparatus displays the structure articles as choices on the printer driver, and the choices displayed on the printer driver are variable.

8. The image forming system according to claim 6, wherein the image processing apparatus displays an appearance diagram of the image forming apparatus on the printer driver on the basis of the definition file, and the appearance diagram displayed on the printer driver is variable.

9. The image forming system according to claim 6, wherein the apparatus structure change information further contains an option module for adding an option function corresponding to the definition file.

10. The image forming apparatus according to claim 9, wherein the option module includes the new option relation information.

11. The image forming system according to claim 4, wherein the new option relation information contains choice display information for displaying structure articles as choices and appearance diagram display information for displaying an appearance diagram of the image forming apparatus.

* * * * *